US010095293B2

(12) United States Patent
Kunnathur Ragupathi et al.

(10) Patent No.: US 10,095,293 B2
(45) Date of Patent: Oct. 9, 2018

(54) SYSTEM AND METHOD FOR DETERMINING POWER SUPPLY CAPABILITY

(71) Applicant: Dell Products L.P., Round Rock, TX (US)

(72) Inventors: Dinesh Kunnathur Ragupathi, Round Rock, TX (US); Wayne Kenneth Cook, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 150 days.

(21) Appl. No.: 15/146,737

(22) Filed: May 4, 2016

(65) Prior Publication Data

US 2017/0322609 A1   Nov. 9, 2017

(51) Int. Cl.
  *G06F 19/00* (2018.01)
  *G06F 1/26* (2006.01)
  *G06F 1/28* (2006.01)

(52) U.S. Cl.
  CPC ............... *G06F 1/266* (2013.01); *G06F 1/28* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,182,232 B1 * | 1/2001 | Klein | ....................... | G06F 1/206 713/300 |
| 7,726,144 B2 * | 6/2010 | Larson | ............... | G05D 23/1931 165/104.33 |
| 8,934,209 B2 | 1/2015 | Mistry et al. | | |
| 9,304,565 B2 | 4/2016 | Mistry et al. | | |
| 2004/0163001 A1 * | 8/2004 | Bodas | ..................... | G06F 1/206 713/300 |
| 2009/0235097 A1 * | 9/2009 | Hamilton | .............. | G06F 1/3203 713/320 |

(Continued)

OTHER PUBLICATIONS

U.S. Appl. No. 14/657,137, filed Mar. 13, 2015, Hasnain Shabbir et al.

(Continued)

*Primary Examiner* — Kidest Bahta
(74) *Attorney, Agent, or Firm* — Baker Botts L.L.P.

(57) ABSTRACT

A system may implement a method for determining the operating capability of a power supply based on multiple environmental factors. Information about environmental factors may be obtained from sensors in the power supply or received from a management controller. These environmental factors may include temperature, line voltage, backpressure, or altitude. A power supply capability analyzer within the power supply may determine that, based on the environmental conditions, it is safe to increase the operating capability of the power supply, or that the operating capability of the power supply should be decreased. After determining the best operating capability for the power supply, it may be communicated to the management controller, after which it may affect the allocation of power in the system. Similar adjustments in operating capabilities may be made for all power supplies in a system or adjustments may be made to individual power supplies based on local environmental conditions.

20 Claims, 7 Drawing Sheets

(56) References Cited

U.S. PATENT DOCUMENTS

| | | | | |
|---|---|---|---|---|
| 2013/0100568 A1* | 4/2013 | Mistry | ............... | H02H 3/006 361/103 |
| 2013/0318371 A1* | 11/2013 | Hormuth | ............... | G06F 1/28 713/320 |
| 2014/0032011 A1* | 1/2014 | Artman | ............. | G05D 23/1932 700/300 |

OTHER PUBLICATIONS

U.S. Appl. No. 14/716,332, filed May 19, 2015, Dinesh K. Ragupathi et al.

U.S. Appl. No. 14/671,270, filed Mar. 27, 2015, Hasnain Shabbir et al.

* cited by examiner

SYSTEM AND METHOD FOR DETERMINING POWER SUPPLY CAPABILITY

BACKGROUND

Field of the Disclosure

This disclosure relates generally to information handling systems and, more particularly, to determining the operating capability of power supplies based on environmental factors.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include one or more power supply modules. Power supply power densities (W/in$^3$) continue to increase year over year. In some cases, this increase in density places a burden on the thermal management of a power supply whereby the operating capacity of the power supply is not necessarily limited by its electrical capabilities but instead may be limited by its thermal capabilities.

SUMMARY

In one aspect, a disclosed method is for determining an operating capability of a power supply. The method may include obtaining a respective value for each of two or more environmental factors in a system in which the power supply is operating, the two or more environmental factors being factors having a potential to affect the operating capability of the power supply. The method may include determining, based at least in part on the respective values for each of the two or more environmental factors, an operating capability of the power supply that differs from a nominal operating capability specified for the power supply, the operating capability being defined in terms of power supply wattage. The method may also include allocating power generated by the power supply to one or more resources of an information handling system in accordance with the determined operating capability.

In any of the disclosed embodiments, the determined operating capability of the power supply may be greater than the nominal operating capability specified for the power supply.

In any of the disclosed embodiments, the determined operating capability of the power supply may be less than the nominal operating capability specified for the power supply.

In any of the disclosed embodiments, the respective values for each of the two or more environmental factors may include a value representing an amount of backpressure on the power supply, and the method may include receiving the value representing an amount of backpressure on the power supply from a management controller in the system in which the power supply is operating.

In any of the disclosed embodiments, the respective values for each of the two or more environmental factors may include one or more values representing a temperature, a line voltage value, or the altitude at which the power supply is operating, and the method may include obtaining each of the one or more values representing the temperature, the line voltage value, or the altitude at which the power supply is operating from a respective sensor in the power supply.

In any of the disclosed embodiments, determining the operating capability of the power supply may include comparing the respective values for each of the two or more environmental factors to values in a lookup table in that associates values of environmental factors to power supply operating capabilities.

In any of the disclosed embodiments, determining the operating capability of the power supply may include executing, by a processor in the power supply, program instructions that calculate the operating capability of the power supply dependent on the respective values for each of the two or more environmental factors.

In any of the disclosed embodiments, the method may further include communicating the determined operating capability of the power supply to a management controller in the system. Communicating the determined operating capability of the power supply may include one or more of: sending a value representing the determined operating capability of the power supply to the management controller over a management bus in the system, writing a value representing the determined operating capability of the power supply to capability to a location in memory that is accessible by the management controller, or notifying the management controller that a value representing the determined operating capability of the power supply has been written to a location in memory that is accessible by the management controller.

In any of the disclosed embodiments, the power supply may be one of a plurality of power supplies in the system for which the same nominal operating capability is specified, and the method may further include obtaining, for each other one of the plurality of power supplies in the system, a respective value for each of two or more environmental factors in the system in which the other power supply is operating. The method may also include determining that, for each of the plurality of power supplies, the respective values obtained for each of the two or more environmental factors are the same, and setting the operating capability of each of the plurality of power supplies in the system to the determined operating capability.

In any of the disclosed embodiments, the power supply may be one of a plurality of power supplies in the system for which the same nominal operating capability is specified, and the method may further include, for each other one of the plurality of power supplies in the system, obtaining a respective value for each of two or more environmental factors in a system in which the other power supply is operating, and determining, based at least in part on the respective values for each of the two or more environmental factors, a respective operating capability of the other power supply that differs from a nominal operating capability specified for the other power supply. For at least two of the plurality of power supplies in the system, the respective values obtained for each of the two or more environmental factors may be different, and the determined operating capabilities may be different.

Another disclosed aspect includes an information handling system including a power supply unit. The power supply unit may include a power supply and a power supply capability analyzer. The power supply capability analyzer may include circuitry to obtain a respective value for each of two or more environmental factors in the information handling system, the two or more environmental factors to be factors with potential to affect the operating capability of the power supply, and to determine, based at least in part on the respective values for each of the two or more environmental factors, an operating capability of the power supply that differs from a nominal operating capability specified for the power supply, the operating capability being defined in terms of power supply wattage. The information handling system may also include a power control module. The power control module may include circuitry to allocate power generated by the power supply to one or more other resources of the information handling system in accordance with the determined operating capability.

In any of the disclosed embodiments, the respective values for each of the two or more environmental factors may include a value to represent an amount of backpressure on the power supply, and the information handling system may also include a management bus and a management controller coupled to the power supply unit via the management bus. The management controller may include circuitry to communicate the value representing the amount of backpressure on the power supply to the power supply unit.

In any of the disclosed embodiments, the respective values for each of the two or more environmental factors may include one or more values to represent a temperature, a line voltage value, or the altitude at which the power supply operates. The power supply capability analyzer may further include circuitry to obtain each of the one or more values representing the temperature, the line voltage value, or the altitude at which the power supply operates from a respective sensor in the power supply unit.

In any of the disclosed embodiments, the power supply capability analyzer may further include a processor and a memory that stores program instructions that when executed by the processor cause the processor to calculate the operating capability of the power supply dependent on the respective values for each of the two or more environmental factors.

In any of the disclosed embodiments, the information handling system may further include a management bus and a management controller coupled to the power supply unit via the management bus. The power supply unit may further include circuitry to communicate the determined operating capability of the power supply to the management controller over the management bus.

A further disclosed aspect includes a power supply unit. The power supply unit may include a power supply, and a power capability analyzer. The power capability analyzer may include circuitry to obtain a respective value for each of two or more environmental factors in the information handling system, the two or more environmental factors to be factors with potential to affect the operating capability of the power supply, and to determine, based at least in part on the respective values for each of the two or more environmental factors, an operating capability of the power supply that differs from a nominal operating capability specified for the power supply, the operating capability being defined in terms of power supply wattage. The power capability analyzer may further include circuitry to write a value to represent the determined operating capability of the power supply to capability to a location in memory that is accessible by a management controller, and to notify the management controller that the value to represent the determined operating capability of the power supply has been written to the location in memory.

In any of the disclosed embodiments, the respective values for each of the two or more environmental factors may include a value to represent an amount of backpressure on the power supply. The power supply capability analyzer may further include circuitry to receive the value to represent the amount of backpressure on the power supply from the management controller.

In any of the disclosed embodiments, the respective values for each of the two or more environmental factors may include one or more values to represent a temperature, a line voltage value, or the altitude at which the power supply operates. The power supply capability analyzer may further include circuitry to obtain each of the one or more values to represent the temperature, the line voltage value, or the altitude at which the power supply operates from a respective sensor in the power supply unit.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As will be described in further detail, the inventors of the present disclosure have developed methods and systems disclosed herein for determining an operating capability of a power supply based, at least in part, on two or more environmental factors in the system in which the power supply is operating (e.g., in an information handling system). In some embodiments, the method may include obtaining information about environmental factors from sensors that are located in the power supply unit itself, and receiving information about other environmental factors from a management controller or another component in the system. In various embodiments, these environmental factors may include, but may not be limited to, temperature, the AC line voltage, backpressure in the system, and/or the altitude at which the power supply is operating.

A power supply capability analyzer within the power supply unit may determine the best operating capability (in terms of the power supply wattage), while taking this information about environmental factors into account. For example, in some cases, the power supply capability analyzer may determine that, based on the environmental conditions under which the power supply is operating, it may be safe to increase the operating capability of the power supply with respect to its specified nominal operating capability. In other cases, the power supply capability analyzer may determine that, based on the environmental conditions under which the power supply is operating, the operating capability of the power supply should be decreased with respect to its specified nominal operating capability. In at least some embodiments, once the best operating capability for the power supply has been determined, the power generated by the power supply may be allocated to one or more resources of the information handling system in accordance with the determined best operating capability. In some embodiments that include multiple power supply units, the same adjustments to the operating capability may be made to all of the power supply units, regardless of whether or not the local environmental conditions under which they are operating are substantially the same. In other embodiments, the operating capabilities of different power supplies in the same information handling system may be adjusted differently when the local environmental conditions under which they are operating are different.

Particular embodiments are best understood by reference to FIGS. 1, 2, 3, 4, 5, 6A-6B, and 7A-7B, in which like numbers are used to indicate like and corresponding parts.

Figure 1:
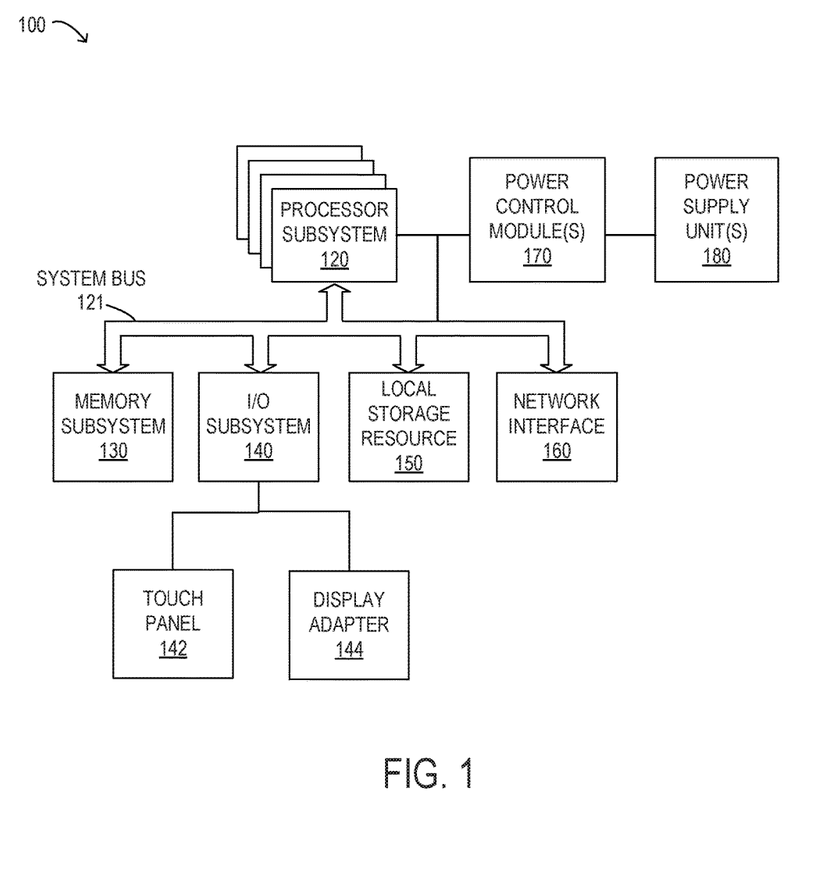
FIG. 1 is a block diagram of selected elements of an embodiment of an information handling system.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display device that is driven by display adapter 144. It is noted that when information handling system 100 is a laptop computer with an integrated display device, display adapter 144 may provide connectivity for an external display.

As illustrated in FIG. 1, system 100 may include one or more power control modules 170 and one or more power supply units (PSUs) 180. In at least some embodiments, power control modules 170 may include power distribution circuitry. In at least some embodiments, power control module(s) 170 may control the allocation of power generated by one or more of the power supply units (PSUs) 180 to other resources in system 100. In some embodiments, one or more of the power control modules 170 may include a management controller (MC). As will be described in further detail below, the management controller may include circuitry and/or logic to determine the operating capability of the PSUs 180 based on two or more environmental factors.

In general, power supplies are not capable of maintaining an output corresponding to their rated power capability over all expected environmental factors and/or conditions. For example, environmental conditions such as input temperature, system backpressure on the power supply, input line voltage, and/or altitude can directly affect the operating capability of a power supply. The system in which a power supply operates typically does not know what the true capability of the power supply is under all of these conditions. In some existing systems, the only information about the operating capability of the power supply that is available to the system is what is read from a status register location that conveys the power rating based solely upon a high line or low line voltage operation. In these existing systems, if the power supply is operating at a level above its rated capability, the only way to protect the power supply and/or to inform the system is through an over temperature warning/protection (OTP) feature of the power supply. However, in at least some embodiments of the present disclosure, by understanding the environment in which a power supply operates, the capability of the power supply may be maximized, after which the system may be informed about the true operating capability of the power supply.

Figure 2:
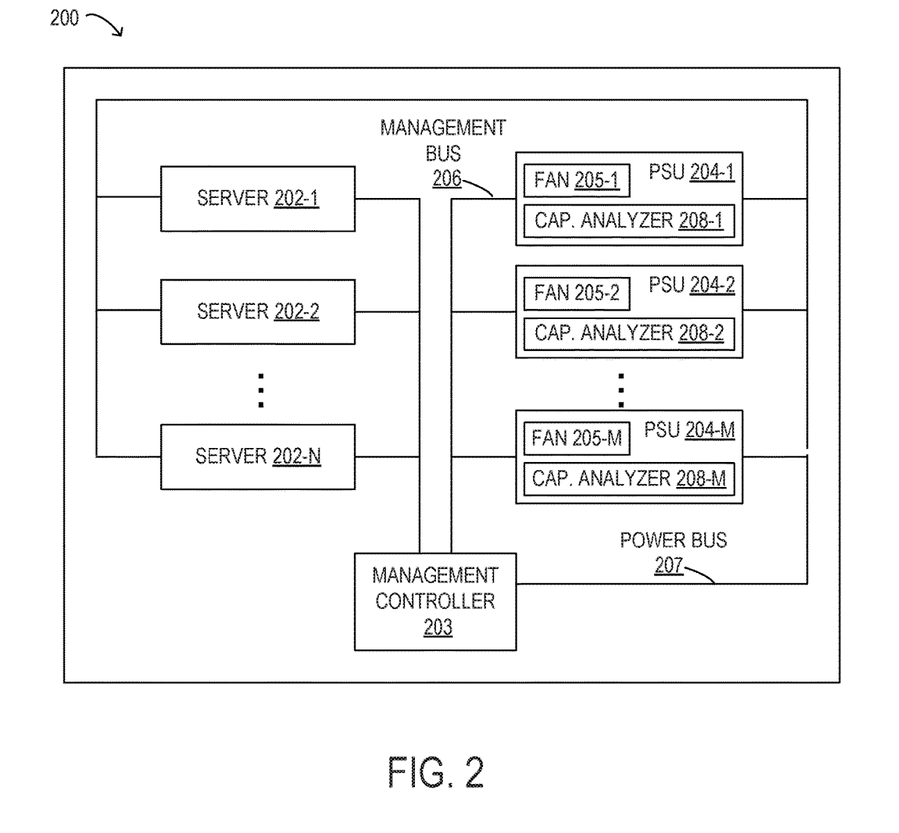
FIG. 2 is a block diagram of selected elements of an embodiment of an information handling system that includes multiple power supply units and a management controller.

FIG. 2 is a block diagram of selected elements of an embodiment of an information handling system 200 that includes multiple power supply units (PSUs) 204 and a Management Controller (MC) 203. In this example, each of the m PSUs 204 includes at least one fan 205. Each of the PSUs 204 also includes a respective PSU capability analyzer 208. In this example embodiment, system 200 also includes n servers 202 to which power generate by the PSUs 204 may be allocated. In some embodiments, servers 202 may be rack-mounted servers. In other embodiments, servers 202 may be blade servers. In this example embodiment, each of the PSU capability analyzers 208 may include circuitry and/or logic to determine the operating capability of the PSU in which it resides based on two or more environmental factors. In various embodiments, the operating capability of the PSUs 204 may be determined individually or collectively. In some embodiments, MC 203 may be a "chassis management controller" that performs management functions on behalf of all of the servers 202 and/or PSUs 204 of information handling system 200. In other embodiments, the management controller may be implemented as (or within) a "remote access controller" that performs management functions on behalf of (and between) various rack servers.

In this example embodiment, system 200 includes a power bus 207, over which power may be distributed from various ones of PSUs 204 to respective ones of the servers 202 and to management controller 203. System 200 also includes a management bus 206 over which commands and/or data (e.g., information about environmental factors) may be communicated from MC 203 to various ones of the PSUs 204, and over which notifications and/or data (e.g., information about environmental factors, results of analyses of operating capabilities of the PSUs, or indications that such results are available to be read) may be communicated from various ones of the PSUs 204 to MC 203.

Existing approaches to limiting PSU operating capacity typically do not take environmental factors such as backpressure into account. For example, there may be positive backpressure on a power supply in an information handling system when a fan inside the chassis (or inside the power supply unit itself, as is common) pushes air onto the power onto the power supply in a direction that adds more air flow into the power supply. Under these conditions, more cubic feet per minute (CFM) of air may be pushed through the power supply and the power supply may be able to cool itself down more quickly than when there is no backpressure on the power supply. This, in turn, may increase the operating capability of the PSU. Conversely, there may be negative backpressure on a power supply in an information handling system when a fan inside the chassis pushes air around near the power supply in a direction that draws air away from the power supply. Under these conditions, it may be more difficult for the power supply to cool itself down than when there is positive or zero backpressure. This, in turn, may decrease the operating capability of the PSU. Through testing, it has been observed that since different servers have different hardware layouts, the backpressure on the power supplies in the system can vary greatly. This, in turn, can significantly affect the operating capabilities of the power supplies. In one specific example, a PSU that has the capability of pushing 15 CFM of air through the power supply when operating without any backpressure may be able to push 17-18 CFM of air through the power supply when operating under positive backpressure, but may only be able to push 13-14 CFM of air through the power supply when operating under negative backpressure. In general, the more air that is pushed through the power supply, the higher the operating capability may be.

In some cases, information about how some environmental factors affect the operating capability of a power supply may be received from a manufacturer or vendor of the power supply. In some embodiments of the present disclosure, such information may be considered when determining the operating capabilities of the power supplies in an information handling system. Table 1 below includes example vendor testing data illustrating some of the effects of temperature and backpressure on the operating capability of a specific power supply unit that is rated at 2700 W. In this example, backpressure values are reported in units of inches of water (wc). In Table 1 negative values in column 2 indicate negative backpressure (which may decrease the operating capability of the PSU). A positive value in column 2 would indicate positive backpressure (which may increase the operating capability of the PSU). This data illustrates that, even when the temperature is same, backpressure differences can cause significant differences in the maximum capability of the power supply.

TABLE 1

Vendor-Supplied Backpressure Information

| Temperature (degrees) | Backpressure (wc) | Max. Capability Limit (W) |
|---|---|---|
| 55 | −1.00 | 2550 |
| 55 | −0.50 | 2600 |
| 55 | −0.25 | 2700 |
| 55 | 0 | 2700 |

In at least some embodiments, the systems and methods described herein may be used to determine the optimum power capability of a PSU based upon environmental conditions such as system backpressure, input temperature, input line voltage, altitude, and/or other factors. This approach may be used to maximize or increase the operating capability of a PSU when environmental factors allow it, or to reduce the operating capability of a PSU when environmental factors warrant it. In some cases, environmental factors can affect the power supplies in different types of systems differently. Therefore, in at least some embodiments, the system may communicate information about some of the environmental factors that can affect the operating capability of a power supply, along with information about how various environmental factors affect the operating capacity of the power supply) to the power supply unit (or to a PSU capability analyzer in the PSU). In some embodiments, information about other environmental conditions may be obtained from the power supply itself (e.g., from various sensors). For example, the altitude may be obtained by reading a sensor in the PSU itself, or by another component (e.g., the MC) reading a sensor that is outside of the PSU and communicating the result to the PSU, in different embodiments. In some embodiments, sensors in the PSU may be read to obtain the inlet temperature, the AC line voltage, or values representing other environmental conditions.

In many systems, the power supply cannot (on its own) determine the backpressure in the server platform in which it operates. In addition, backpressure may vary on different platforms based on the hardware layout. In some embodiments of the present disclosure, a management controller (MC) in the system may supply the backpressure value for the server platform to the power supply. Table 2 below illustrates example data indicating the backpressure for three different server platforms A, B, and C. In this example, positive backpressure is applied to the power supply on two of the platforms (A and C), while on one of the platforms (B), negative backpressure is applied to the power supply.

TABLE 2

Backpressure Values for Different Server Platforms

| Platform | Backpressure (wc) |
|---|---|
| A | 1.0 |
| B | −0.5 |
| C | 0.25 |

Figure 3:
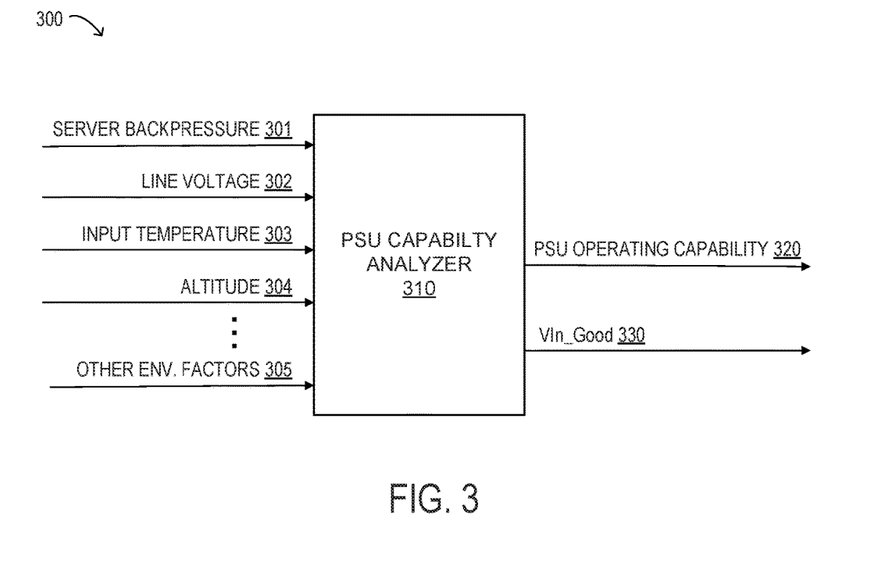
FIG. 3 is a block diagram of selected elements of an embodiment of a power supply unit (PSU) capability analyzer.

FIG. 3 is a block diagram of selected elements of a power supply unit (PSU) capability analyzer 310, according to at least some embodiments. PSU capability analyzer 310 may be implemented in a PSU using any combination of hardware and software elements, in different embodiments. For example, in some embodiments, PSU capability analyzer 310 may include hardware circuitry or logic to determine an optimum power supply wattage capability (sometimes referred to as an optimum operating capability) of a respective PSU in which it is implemented based, at least in part, on two or more environmental factors. In other embodiments, PSU capability analyzer 310 may include a processor and a memory stores program instructions executable by the processor to determine an optimum power supply wattage capability of the PSU in which it is implemented based, at least in part, on two or more environmental factors.

In this example, the inputs to PSU capability analyzer 310 may include an indication of the server backpressure (shown as 301). In at least some embodiments, the backpressure indication may be communicated to the PSU by a management controller (MC), e.g., over a management bus. The inputs to PSU capability analyzer 310 may include information about the AC line voltage (shown as 302). For example, this information may indicate whether the AC line voltage is high or low. In at least some embodiments, the AC line voltage information may be obtained from a sensor within the PSU itself that is read by the PSU. The inputs to PSU capability analyzer 310 may also include an indication of the input temperature (shown as 303). In at least some embodiments, the input temperature information may be obtained from a sensor within the PSU itself that is read by the PSU. The inputs to PSU capability analyzer 310 may also include an indication of the altitude in which the PSU is operating (shown as 304). In some embodiments, the altitude information may be obtained from a sensor within the PSU itself that is read by the PSU. In other embodiments, the altitude information may be received from the management controller (MC) or from another component in the system.

In some embodiments, the inputs to PSU capability analyzer 310 may include information about other environmental factors that can affect the operating capability of the PSU (shown as 305). In some embodiments, these other environmental factors may include factors that are specific to the system and/or application in which the PSU is implemented or to the location at which the PSU is operating. The outputs of PSU capability analyzer 310 may include an indication of the determined operating capability of the PSU (shown as 320). In at least some embodiments, this output may be provided to the MC by the PSU. In some embodiments, this indication may include writing a value representing the determined operating capability of the PSU to a register or memory location from which it can be read by the MC. In some embodiments, the outputs of PSU capability analyzer 310 may include an indication (shown as 330) that the operating capability of the PSU has been determined. For example, a Vin_Good signal may be issued (or asserted) when the value representing the determined operating capability of the PSU has been written to a register or memory location and is ready to be read by the MC.

In some embodiments, the information about various environmental factors that is input to the PSU capability analyzer 310 may be provided as digital signals that encode values representing the state of the system in terms of those environmental factors in one or more bits. In other embodiments, information about one or more of the environmental factors may be provided to the PSU capability analyzer 310 as analog signals that encode values representing the state of the system in terms of those environmental factors through amplitude or pulse modulation. For example, an analog signal representing the altitude at which the PSU is operating may have a value in a range from 0-10 V representing a range of altitudes from sea level (or below) to some maximum expected altitude. Other information about environmental factors may be similarly encoded in analog signals that are inputs to the PSU capability analyzer 310. In one such embodiments, all of these analog signals may be aggregated or multiplexed together in different ways to determine (using hardware circuitry) the optimum operating capability of the PSU. For example, if the voltage of any one of the input signals crosses a respective threshold defined for the corresponding environmental factor, this may trigger an increase or decrease in the operating capability of the PSU. In some embodiments, the output of a PSU capability analyzer 310 that takes analog signals as its inputs may output an analog signal that indicates the absolute operating capability of the PSU or that indicates the relative change (up or down) to in the rated operating capability of the PSU.

Figure 4:
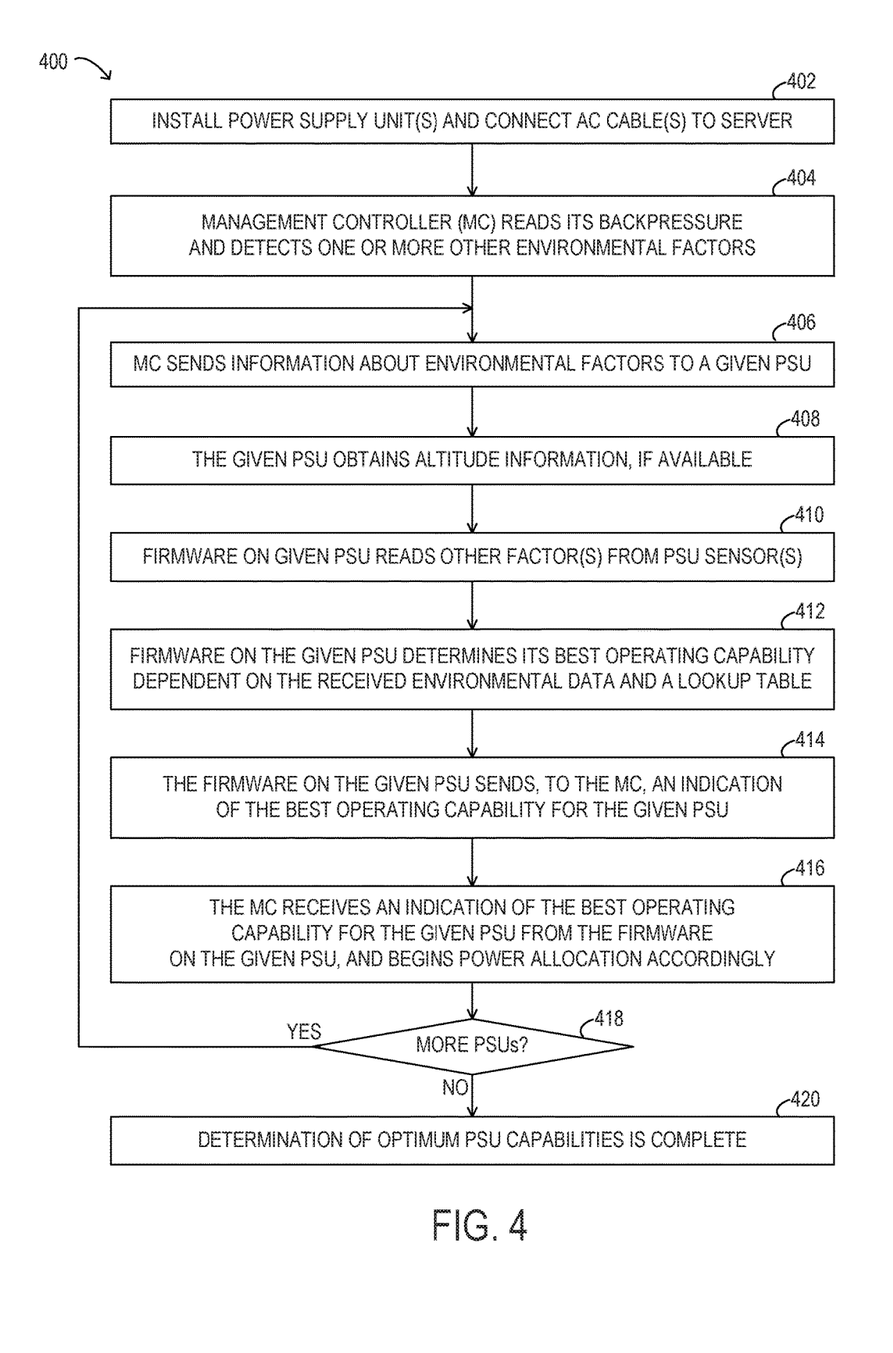
FIG. 4 is flowchart depicting selected elements of an embodiment of a method for determining the operating capability of a PSU based on environmental factors.

Referring now to FIG. 4, a block diagram of selected elements of an embodiment of a method 400 for determining the operating capability of a PSU based on environmental factors, as described herein, is depicted in flowchart form. In various embodiments, method 400, which represents a control flow, may be performed by one or more instances of an information handling system 100 (see FIG. 1) or an information handling system 200 (see FIG. 2). It is noted that certain operations described in method 400 may be optional or may be rearranged in different embodiments.

In FIG. 4, method 400 may begin (at 402) with the installation of one or more Power Supply Unit(s) (PSUs) in a system and the connection of AC cables to the PSUs to provide power to them. In method 400 (at 404), a Management Controller (MC) in the system may read an indication of backpressure for the system and may detect one or more other environmental factors that can affect the operating capability of the PSUs in the system. In some embodiments, an indication of the backpressure for the particular server (or for a particular server platform) may be stored in a power table that includes data obtained during development of the server or server platform. In some embodiments, the environmental information detected by the MC may include an indication of the backpressure in the system. In method 400 (at 406), the management controller sends information about the backpressure and any other detected environmental factors to a given PSU. For example, the MC may send this information over a management bus by issuing a command to push the information to the PSU. In at least some embodiments, this information may be sent as signals (or combinations of signals) that are pushed down different lines on the management bus. In other embodiments, this information may be sent to the PSU in response to the execution (by a processor in the system) of a command defined according to an application programming interface.

In method 400 (at 408), the given PSU may begin obtaining additional information about environmental factors that may affect its operating capability, including altitude information, if it is available. For example, in various embodiments, firmware executing on given PSU may obtain altitude information from a local altitude pressure sensor, or the given PSU may receive altitude information from another source, such as another component of the system or from a remote source. In method 400 (at 410), firmware executing on the given PSU obtains information about other environmental factors by reading the values of one or more environmental sensors in the PSU. For example, the PSU firmware may read the values of sensors that detect and/or measure inlet temperature, voltage line information (indicating, for example, if the line voltage is high or low), and/or other environmental information.

After gathering information about environmental factors locally on the given PSU and receiving information about environmental factors from the MC, method 400 may include (at 412) the PSU firmware executing on the given PSU determining its best operating capability of the given PSU dependent (at least in part) on the received environmental data. In some embodiments, the determination may be dependent on a lookup table that includes information associating different environmental factors (and/or combinations of environmental factors) to their respective effects on the operating capability of the PSU. Such a lookup table may include information provided by a power supply manufacturer or vendor and/or information previously obtained by measuring the effects of environmental changes on various power supply units. In other embodiments, the determination may include applying a formula to (or performing a calculation on) various combinations of the values representing the environmental factors.

In method 400 (at 414), the PSU firmware executing on the given PSU sends, to the MC, an indication of the best operating capability for the given PSU, as determined based on the information available about environmental factors that affect the operating capability of the given PSU. In method 400 (at 416), the MC receives an indication of the best operating capability for the given PSU from the firmware on the given PSU, and begins allocating power in the system in accordance with the received indication. If (at 418) there are more PSUs that are controlled by the MC for which the best operating capability is to be determined, the operations shown as 404-416 may be repeated to determine a respective best operating capability for each additional PSU. Once these operations have been performed for all of the PSUs, the determination of the optimum PSU capabilities is complete (at 420).

Figure 5:
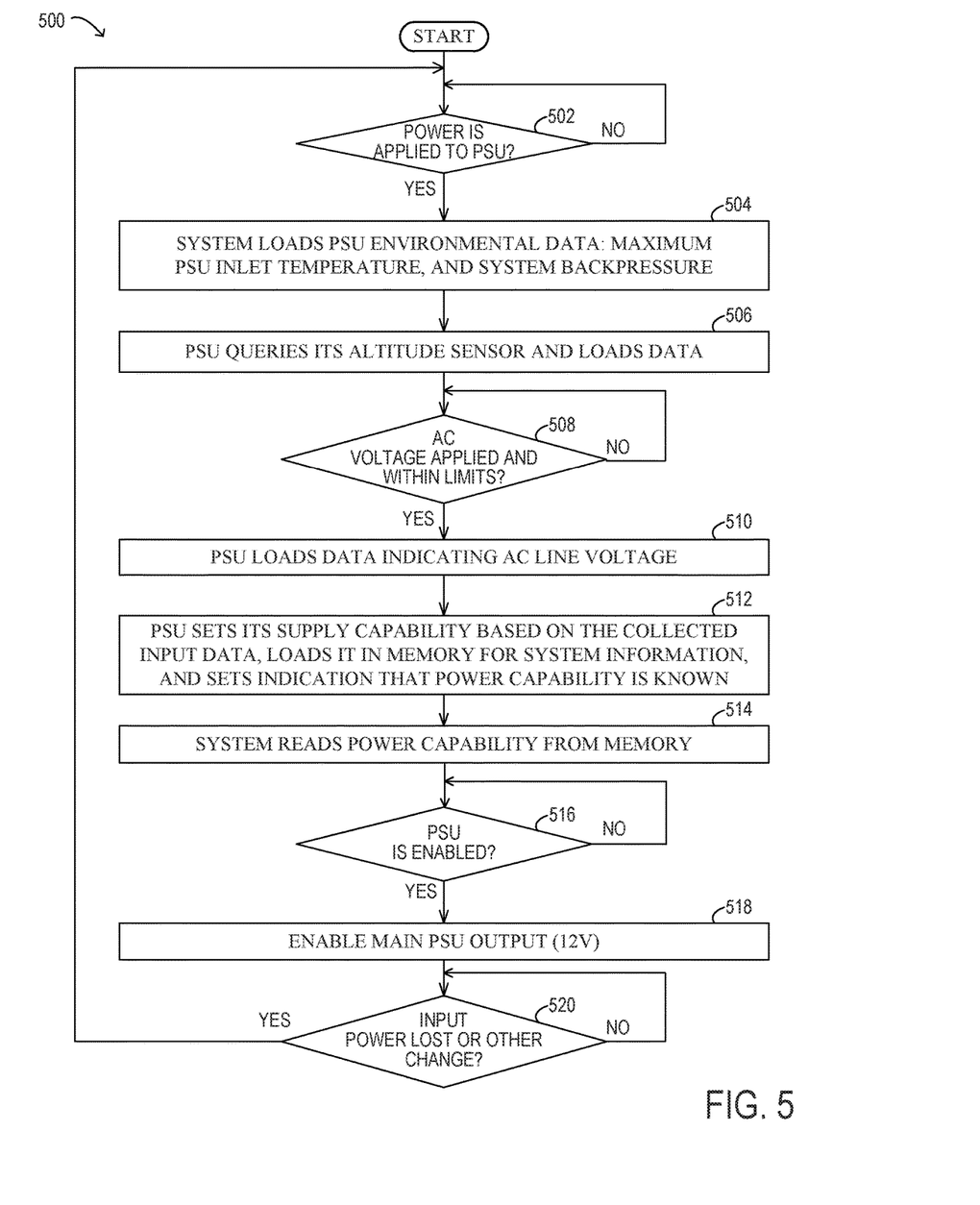
FIG. 5 is flowchart depicting selected elements of an embodiment of a method for determining power supply wattage capability based on environmental factors.

Referring now to FIG. 5, a block diagram of selected elements of an embodiment of a method 500 for determining power supply wattage capability based on environmental factors, as described herein, is depicted in flowchart form. In various embodiments, method 500 may be performed by one or more instances of an information handling system 100 (see FIG. 1) or an information handling system 200 (see FIG. 2). It is noted that certain operations described in method 500 may be optional or may be rearranged in different embodiments.

As illustrated in FIG. 5, method 500 begins (at 502) when either an AC input voltage or a 12V auxiliary (standby) voltage is applied to a given power supply unit (PSU). Until then, the PSU may be in an idle state or a wait state. Once either of these conditions is met, a secondary DSP in the PSU is activated, which is capable of communicating across an interconnect (such as an 12C bus) to the system in which the PSU operates. In at least some embodiments, the system is made aware of the presence of the PSU through a presence detection pin of the power supply. As illustrated at 504, once power has been applied to the PSU (and the system has identified the presence of the PSU), the system may load into the PSU any known information about environmental factors or environmental requirements that are being placed on the PSU. For example, in at least some embodiments, a management controller (MC) in the system may load information into the PSU indicating the maximum inlet temperature and/or the system backpressure.

In method 500 (at 506), the PSU queries its altitude sensor to determine its elevation and loads that data for subsequent use in determining the supply wattage capability of the PSU. The PSU may then query an indication of the AC line voltage. If (at 508) it is determined that the AC line voltage is not within its specified range of operation, the PSU remains in a wait state until the AC line voltage is determined to be within its specified operational range. Once (at 508) the AC line voltage is determined to be within its operational limits, the PSU (at 510) loads data indicating the AC line voltage for subsequent use in determining the supply wattage capability of the PSU. At this point, the PSU will have obtained information about (at least) the four environmental conditions described above (e.g., the maximum inlet temperature, system backpressure, altitude, and AC line voltage) and will be able to determine its rated power capacity.

In method 500 (at 512), the PSU sets its supply wattage capability based on the collected input data, loads it in memory for system information, and sets an indication that power capability is known. In some embodiments, the determination of the supply wattage capability may be dependent on a lookup table that includes information associating different environmental factors (and/or combinations of environmental factors) to their respective effects on the operating capability of the PSU. As described above, such a lookup table may include information provided by a power supply manufacturer or vendor and/or information previously obtained by measuring the effects of environmental changes on various power supply units. In other embodiments, the determination may include applying a formula to (or performing a calculation on) various combinations of the values representing the environmental factors. In at least some embodiments, the PSU may write a value indicating the supply wattage capability to a dedicated status register or to a location in memory from which the supply wattage capability is to be read by the management controller in the system. In at least some embodiments, the PSU may issue an indication (e.g., by setting a Vin_Good signal or other indicator) to notify the system that a determination of the supply wattage capability is complete and that a value representing the determined supply wattage capability has been written to a register or memory location accessible to the system.

In response to the notification, the system (or MC thereof) will read the value representing the determined power capability from the location at which it is stored in memory (as in 514). At this point (at 516), if the PSU is not enabled, the PSU will remain in a wait state until it is enabled. If, or once, the PSU is enabled, the main PSU output (12 v) will be enabled (as in 518). As illustrated in FIG. 5, in some embodiments (at 520), following a loss of input power (e.g., if the AC input voltage is removed and subsequently reapplied) or if a change in the environmental conditions occurs that can affect the power capability of the PSU, some or all of the operations illustrated in FIG. 5 may be repeated to determine the current supply wattage capability based on the updated conditions. In some embodiments, the operations shown as 504-518 may be performed periodically (not shown) to ensure that the PSU operates at the best supply wattage capability given any changing environmental conditions. In other embodiments, the operations shown as 504-518 may be performed on a demand basis (e.g., in response to an specific interrupt or another type of explicit request to perform the analysis) to ensure that the PSU operates at the best supply wattage capability given the current environmental conditions at a specific point in time. In still other embodiments, a supply wattage capability determined as described above during an initial power-up may be retained by the PSU until and unless its AC input voltage is removed, regardless of any changing environmental conditions.

Figure 6A:
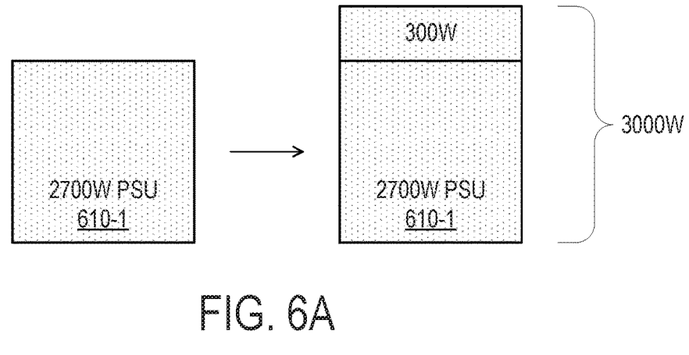
FIGS. 6A and 6B illustrate examples of the use of a PSU capability analyzer to determine the operating capability of an individual PSU, according to at least some embodiments.
Figure 6B:
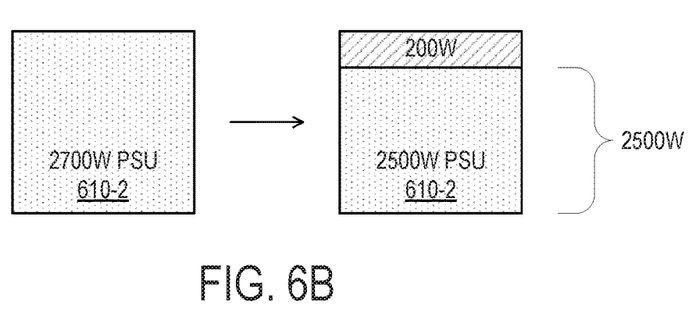

FIGS. 6A and 6B illustrate examples of the use of a PSU capability analyzer to determine the operating capability of an individual PSU, according to at least some embodiments. In these examples, each PSU 610 has a specified nominal power supply wattage rating of 2700 W. FIG. 6A illustrates that, under certain environmental conditions, such as a relatively low input temperature, a positive backpressure, and an altitude in particular range, the operating capability of a given PSU (shown as 610-1) may be increased. In this example, the operating capability of PSU 610-1 is increased by 300 W, resulting in an operating capability of 3000 W.

FIG. 6B illustrates that, under other environmental conditions, such as a relatively high input temperature, a negative backpressure, and/or other conditions, the operating capability of a given PSU (shown as 610-2) may be decreased. In this example, the operating capability of PSU 610-2 is decreased by 200 W, resulting in an operating capability of 2500 W.

In some information handling systems, the values of at least some of the environmental factors that can potentially affect the operating capability of the power supplies may be the same for all of the power supplies in the system.

However, other ones of the values of the environmental factors may not be the same for all of the power supplies in the system. For example, all of the power supplies within a single chassis or rack may be operating at substantially the same altitude or may experience the same amount of backpressure. However, based on their locations within the chassis or rack, at least some of the power supplies may be operating at different temperatures, or may have different AC line voltages. In some embodiments that include multiple power supply units, the same adjustments to the operating capability may be made to all of the power supply units, regardless of whether or not the local environmental conditions under which they are operating are substantially the same. In other embodiments, the operating capabilities of different power supplies in the same information handling system may be adjusted differently when the local environmental conditions under which they are operating are different.

Figure 7A:
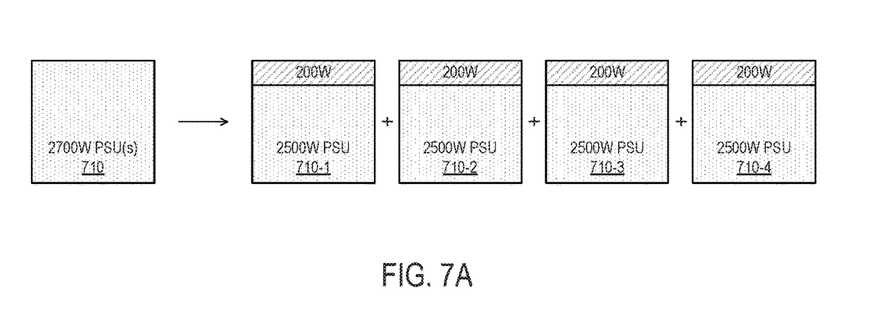
FIGS. 7A and 7B illustrate examples of the use of PSU capability analyzers to determine the operating capability of multiple PSUs in a system, to at least some embodiments.
Figure 7B:
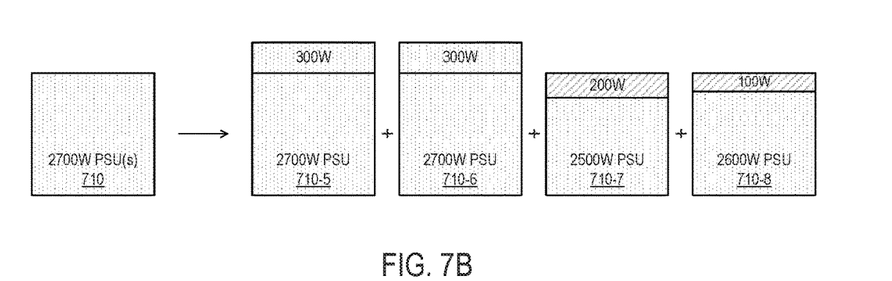

FIGS. 7A and 7B illustrate examples of the use of PSU capability analyzers to determine the operating capability of multiple PSUs in a system, according to at least some embodiments. In each of these examples, which may be representative of a typical server environment, there are four PSUs 710, each of which has a specified nominal power supply wattage rating of 2700 W. Therefore, prior to any adjustments to the operating capability of these PSUs, the total (collective) operating capability for the four PSUs is 10800 W.

FIG. 7A illustrates an example in which, based on certain environmental conditions, the operating capability of each of the PSUs 710 is decreased. More specifically, the operating capability of each of the PSUs 710 is decreased by the same amount (200 W). Therefore, following this adjustment to the operating capability of each of these PSUs, the total (collective) operating capability for the four PSUs (710-1, 710-2, 710-3, and 710-4) is 10000 W.

As described herein, data has shown that some environmental factors can vary within a chassis or server. In such cases, the application of the methods described herein for determining the optimum operating capability of a power supply may result in a situation in which power supplies in the same chassis or server have unequal power supply capabilities. FIG. 7B illustrates an example in which, based on environmental conditions, the operating capability of each of the PSUs 710 is adjusted. However, in this example, based on individual ones of the PSUs 710 experiencing different environmental conditions, the adjustments made to the operating capabilities of these PSUs 710 are not the same. More specifically, the operating capabilities of PSU 710-5 and PSU 710-6 are increased by 300 W (each), the operating capability of PSU 710-7 is decreased by 200 W, and the operating capability of PSU 710-8 is decreased by 100 W. Therefore, following these adjustments made to the operating capabilities of these four PSUs, the total (collective) operating capability for these PSUs is 11100 W.

As described above, an information handling system may, in some embodiments, implement a method for determining the optimum capability of one or more PSUs based on two or more environmental factors. In at least some embodiments, the determinations made using this method may drive the budgeting and/or allocation of power to various servers and other components in the system. By optimizing the operating capability of its power supplies a system may operate more efficiently, while also operating safely.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for determining an operating capability of a power supply, comprising:
    obtaining a respective value for each of two or more environmental factors in a system in which the power supply is operating, the two or more environmental factors being factors having a potential to affect the operating capability of the power supply;
    determining, based at least in part on the respective values for each of the two or more environmental factors, an operating capability of the power supply that differs from a nominal operating capability specified for the power supply, the operating capability being defined in terms of power supply wattage;
    allocating power generated by the power supply to one or more resources of an information handling system in accordance with the determined operating capability.

2. The method of claim 1, wherein the determined operating capability of the power supply is greater than the nominal operating capability specified for the power supply.

3. The method of claim 1, wherein the determined operating capability of the power supply is less than the nominal operating capability specified for the power supply.

4. The method of claim 1, wherein:
    the respective values for each of the two or more environmental factors include a value representing an amount of backpressure on the power supply; and
    the method includes receiving the value representing an amount of backpressure on the power supply from a management controller in the system in which the power supply is operating.

5. The method of claim 1, wherein:
    the respective values for each of the two or more environmental factors include one or more values representing a temperature, a line voltage value, or the altitude at which the power supply is operating; and
    the method includes obtaining each of the one or more values representing the temperature, the line voltage value, or the altitude at which the power supply is operating from a respective sensor in the power supply.

6. The method of claim 1, wherein determining the operating capability of the power supply comprises comparing the respective values for each of the two or more environmental factors to values in a lookup table in that associates values of environmental factors to power supply operating capabilities.

7. The method of claim 1, wherein determining the operating capability of the power supply comprises executing, by a processor in the power supply, program instructions that calculate the operating capability of the power supply dependent on the respective values for each of the two or more environmental factors.

8. The method of claim 1, wherein:
    the method further comprises communicating the determined operating capability of the power supply to a management controller in the system, wherein communicating the determined operating capability of the power supply comprises one or more of:
        sending a value representing the determined operating capability of the power supply to the management controller over a management bus in the system;

writing a value representing the determined operating capability of the power supply to capability to a location in memory that is accessible by the management controller; or notifying the management controller that a value representing the determined operating capability of the power supply has been written to a location in memory that is accessible by the management controller.

9. The method of claim 1, wherein:
the power supply is one of a plurality of power supplies in the system for which a same nominal operating capability is specified;
the method further comprises:
obtaining, for each other one of the plurality of power supplies in the system, a respective value for each of two or more environmental factors in the system in which the other power supply is operating;
determining that, for each of the plurality of power supplies, the respective values obtained for each of the two or more environmental factors are the same; and
setting the operating capability of each of the plurality of power supplies in the system to the determined operating capability.

10. The method of claim 1, wherein:
the power supply is one of a plurality of power supplies in the system for which a same nominal operating capability is specified;
the method further comprises:
for each other one of the plurality of power supplies in the system:
obtaining a respective value for each of two or more environmental factors in a system in which the other power supply is operating; and
determining, based at least in part on the respective values for each of the two or more environmental factors, a respective operating capability of the other power supply that differs from a nominal operating capability specified for the other power supply; and
for at least two of the plurality of power supplies in the system:
the respective values obtained for each of the two or more environmental factors are different; and
the determined operating capabilities are different.

11. An information handling system, comprising:
a power supply unit comprising;
a power supply; and
a power supply capability analyzer comprising circuitry to:
obtain a respective value for each of two or more environmental factors in the information handling system, the two or more environmental factors to be factors with potential to affect the operating capability of the power supply;
determine, based at least in part on the respective values for each of the two or more environmental factors, an operating capability of the power supply that differs from a nominal operating capability specified for the power supply, the operating capability being defined in terms of power supply wattage; and
a power control module comprising circuitry to:
allocate power generated by the power supply to one or more other resources of the information handling system in accordance with the determined operating capability.

12. The information handling system of claim 11, wherein the determined operating capability of the power supply is greater than the nominal operating capability specified for the power supply.

13. The information handling system of claim 11, wherein the determined operating capability of the power supply is less than the nominal operating capability specified for the power supply.

14. The information handling system of claim 11, wherein:
the respective values for each of the two or more environmental factors include a value to represent an amount of backpressure on the power supply; and
the information handling system further comprises:
a management bus; and
a management controller coupled to the power supply unit via the management bus, the management controller comprising circuitry to communicate the value representing the amount of backpressure on the power supply to the power supply unit.

15. The information handling system of claim 11, wherein:
the respective values for each of the two or more environmental factors include one or more values to represent a temperature, a line voltage value, or the altitude at which the power supply operates; and
the power supply capability analyzer further comprises circuitry to obtain each of the one or more values representing the temperature, the line voltage value, or the altitude at which the power supply operates from a respective sensor in the power supply unit.

16. The information handling system of claim 11, wherein:
the power supply capability analyzer further comprises further comprises:
a processor; and
a memory that stores program instructions that when executed by the processor cause the processor to calculate the operating capability of the power supply dependent on the respective values for each of the two or more environmental factors.

17. The information handling system of claim 11, wherein:
the information handling system further comprises:
a management bus; and
a management controller coupled to the power supply unit via the management bus;
the power supply unit further comprises circuitry to communicate the determined operating capability of the power supply to the management controller over the management bus.

18. A power supply unit, comprising:
a power supply; and
a power capability analyzer comprising circuitry to:
obtain a respective value for each of two or more environmental factors in the information handling system, the two or more environmental factors to be factors with potential to affect the operating capability of the power supply;
determine, based at least in part on the respective values for each of the two or more environmental factors, an operating capability of the power supply that differs from a nominal operating capability specified for the power supply, the operating capability being defined in terms of power supply wattage;

write a value to represent the determined operating capability of the power supply to capability to a location in memory that is accessible by a management controller; and notify the management controller that the value to represent the determined operating capability of the power supply has been written to the location in memory.

19. The power supply unit of claim 18, wherein:

the respective values for each of the two or more environmental factors include a value to represent an amount of backpressure on the power supply; and the power supply capability analyzer further comprises circuitry to receive the value to represent the amount of backpressure on the power supply from the management controller.

20. The power supply unit of claim 18, wherein:

the respective values for each of the two or more environmental factors include one or more values to represent a temperature, a line voltage value, or the altitude at which the power supply operates; and the power supply capability analyzer further comprises circuitry to obtain each of the one or more values to represent the temperature, the line voltage value, or the altitude at which the power supply operates from a respective sensor in the power supply unit.

* * * * *